(12) United States Patent
Sugita (10) Patent No.: US 9,667,813 B2
(45) Date of Patent: May 30, 2017

(54) FACSIMILE APPARATUS THAT CAN STORE FAX IMAGE DATA AS TRANSMISSION HISTORY INFORMATION WITHOUT STORING COVER SHEET IMAGE, CONTROL METHOD FOR FACSIMILE APPARATUS, AND STORAGE MEDIUM

(71) Applicant: CANON KABUSHIKI KAISHA, Tokyo (JP)

(72) Inventor: Hikaru Sugita, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/877,640

(22) Filed: Oct. 7, 2015

(65) Prior Publication Data

US 2016/0105569 A1    Apr. 14, 2016

(30) Foreign Application Priority Data

Oct. 8, 2014    (JP) .................................. 2014-207151

(51) Int. Cl.
*H04N 1/00* (2006.01)
*H04N 1/21* (2006.01)

(52) U.S. Cl.
CPC ..... *H04N 1/00204* (2013.01); *H04N 1/00281* (2013.01); *H04N 1/00411* (2013.01); *H04N 1/2166* (2013.01); *H04N 2201/0094* (2013.01)

(58) Field of Classification Search
CPC .................................................. H04N 1/00204
USPC ........................................................ 358/1.15
See application file for complete search history.

(56) References Cited

U.S. PATENT DOCUMENTS

| | | | | |
|---|---|---|---|---|
| 2002/0131065 | A1* | 9/2002 | Sweetland | ........... G06K 15/007 358/1.13 |
| 2014/0153019 | A1* | 6/2014 | Kida | ....................... G06F 3/002 358/1.13 |
| 2015/0116785 | A1* | 4/2015 | Yamazaki | .......... H04N 1/32112 358/402 |

FOREIGN PATENT DOCUMENTS

JP    2006-330939 A    12/2006

* cited by examiner

*Primary Examiner* — Jacky X Zheng
(74) *Attorney, Agent, or Firm* — Canon U.S.A., Inc. IP Division (57) ABSTRACT

In a case where facsimile transmission is carried out while a cover sheet is added, a transmission image that does not include the cover sheet is output to an archive destination as transmission history information.

7 Claims, 10 Drawing Sheets

| FAX SETTING | | |
|---|---|---|
| TRANSMISSION DOCUMENT ARCHIVE | ON > | ~801 |
| DESTINATION | XXXX > | ~802 |
| COVER SHEET TRANSMISSION SETTING | ON > | ~803 |

FIG. 10

FACSIMILE APPARATUS THAT CAN STORE FAX IMAGE DATA AS TRANSMISSION HISTORY INFORMATION WITHOUT STORING COVER SHEET IMAGE, CONTROL METHOD FOR FACSIMILE APPARATUS, AND STORAGE MEDIUM

BACKGROUND OF THE INVENTION

Field of the Invention

The present invention relates to a facsimile apparatus that can separately save image data used for facsimile transmission, a control method for the facsimile apparatus, and a storage medium.

Description of the Related Art

Up to now, a job archiving function for recording and saving all processed image data together with logs of all jobs such as copying, printing, scanning, and faxing in a multi-function peripheral (MFP) has been proposed (Japanese Patent Laid-Open No. 2006-330939). The logs and the image data which are subjected to the job archive are temporarily saved on a hard disc in the MFP and periodically transferred to a specified file server on the basis of a previously determined protocol.

Meanwhile, small-scale MFPs targeted at small offices and the like include an MFP having only a fax archiving function for separately transferring image data transmitted by fax together with a log of the fax transmission to a specified destination. An e-mail address or a server message block (SMB) file path can be specified as the transfer destination, and the image data of the fax is converted into a general-purpose image file to be transferred.

In addition, a function for transmitting image data generated by a client (a computer, a tablet terminal, or the like) to the MFP via a local area network (LAN) and performing fax transmission from the MFP is proposed as a function of the fax transmission. At this time, information including a transmission destination (fax number), transmission image data, cover sheet information, and the like is transmitted from the client to the MFP. In a case where the cover sheet information is transmitted, the MFP generates a cover sheet image from the cover sheet information and transmits by fax the generated cover sheet image and the transmission image to a specified destination.

As described above, the archiving function is for transferring the transmitted image data to the specified destination and saving the image data. For this reason, when the cover sheet information is transmitted from a client, the cover sheet image is generated in the MFP, and the cover sheet image is added to an initial position of the transmission image to perform the fax transmission, then the transmission image is output together with the cover sheet image to the archive destination where the transmission image is saved. Since the information corresponding to this cover sheet image is transmitted to the archive destination as the log, there is little need to save this as the image data. In addition, when the image data including the cover sheet image is output to the archive destination too, management of the image data becomes complex, and the transmission data size is increased.

SUMMARY OF THE INVENTION

A facsimile apparatus according to an aspect of the present invention includes: a reception unit configured to receive from an external apparatus destination information, cover sheet information, and image data which are used for facsimile transmission; a generation unit configured to generate a cover sheet image from the cover sheet information received by the reception unit; a transmission unit configured to transmit by fax the cover sheet image generated by the generation unit and the image data received by the reception unit to a destination indicated by the destination information; and a storage control unit configured to store the image data in a storage unit as transmission history information without storing the cover sheet image in the storage unit as the transmission history information.

Further features of the present invention will become apparent from the following description of exemplary embodiments with reference to the attached drawings.

DESCRIPTION OF THE EMBODIMENTS

Hereinafter, exemplary embodiments of the present invention will be described in detail with reference to the drawings. It is noted that the following exemplary embodiments are not intended to limit the invention according to the scope of claims, and all of combinations of features described in the exemplary embodiments are not necessarily needed for the solving measures of the invention.

First Exemplary Embodiment

Figure 1:
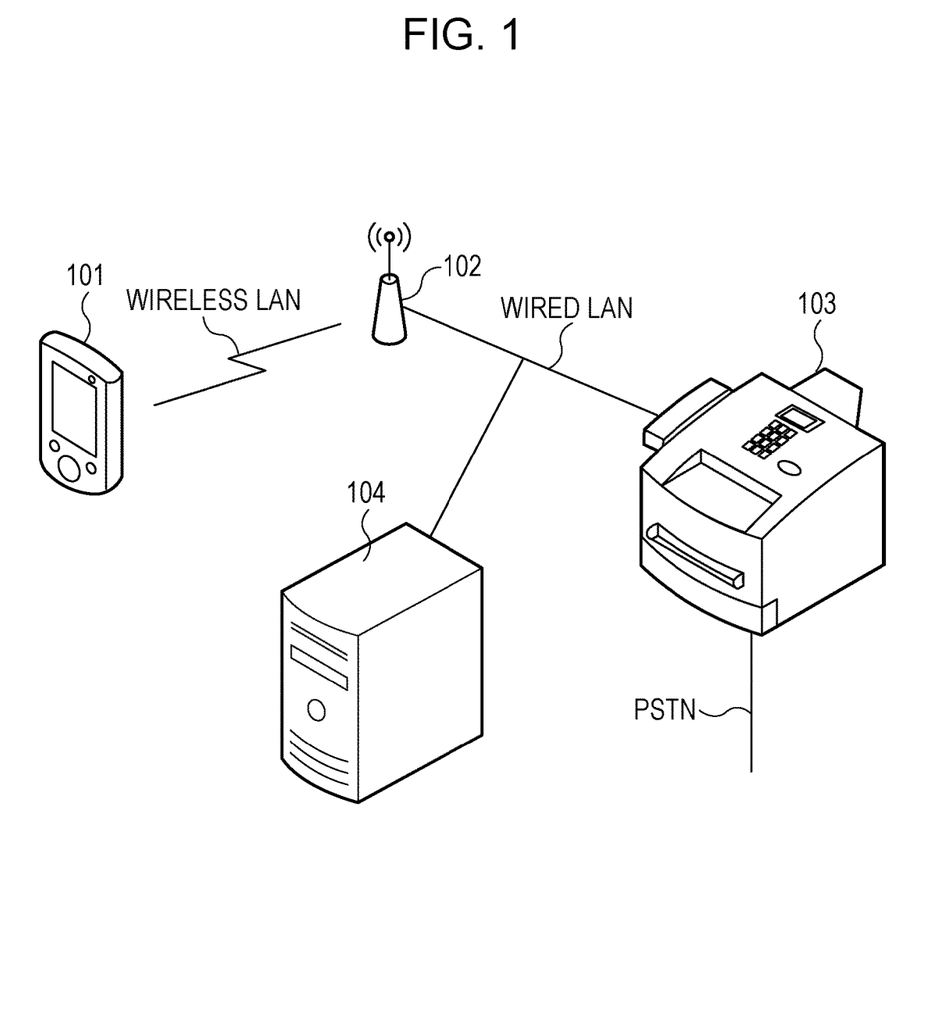
FIG. 1 illustrates a configuration of a network according to an exemplary embodiment.

A first exemplary embodiment of the present invention will be described. FIG. 1 illustrates an entirety of a network system. The network system according to the present exemplary embodiment includes a tablet-type terminal 101, a wireless network router 102, an MFP 103, and a file server 104, which mutually realize a network connection. The tablet-type terminal 101 corresponding to an example of an information processing apparatus communicates with the MFP 103 via the wireless network router (wireless access point) 102. The MFP 103 corresponds to an example of an image processing apparatus. It is noted that the stand-alone MFP 103 may be referred to as an image processing system, or an entirety including the MFP 103 and the tablet-type terminal 101 may be referred to as the image processing system. In addition, the MFP 103 functions as an image processing apparatus configured to process image data and also functions as an image processing apparatus configured to transmit image data by fax or transmit the image data to the external file server 104. The tablet-type terminal 101 is connected to the wireless network router 102 by a wireless LAN. The MFP 103 is connected to the wireless network router 102 by a wired LAN. The MFP 103 is further connected to the file server 104 at an archive destination via the wired LAN. The MFP 103 is also connected to a publicly-switched telephone network (PSTN). The file server 104 functions as a server configured to manage transmission history information.

It is noted that the network configuration illustrated in FIG. 1 is merely an example and is not limited to this example. For example, the tablet-type terminal 101 may be connected to the wireless network router 102 by the wired LAN. In addition, the MFP 103 may be connected to the wireless network router 102 by the wireless LAN. Furthermore, the tablet-type terminal 101 and the MFP 103 may be connected to the same network.

Figure 2:
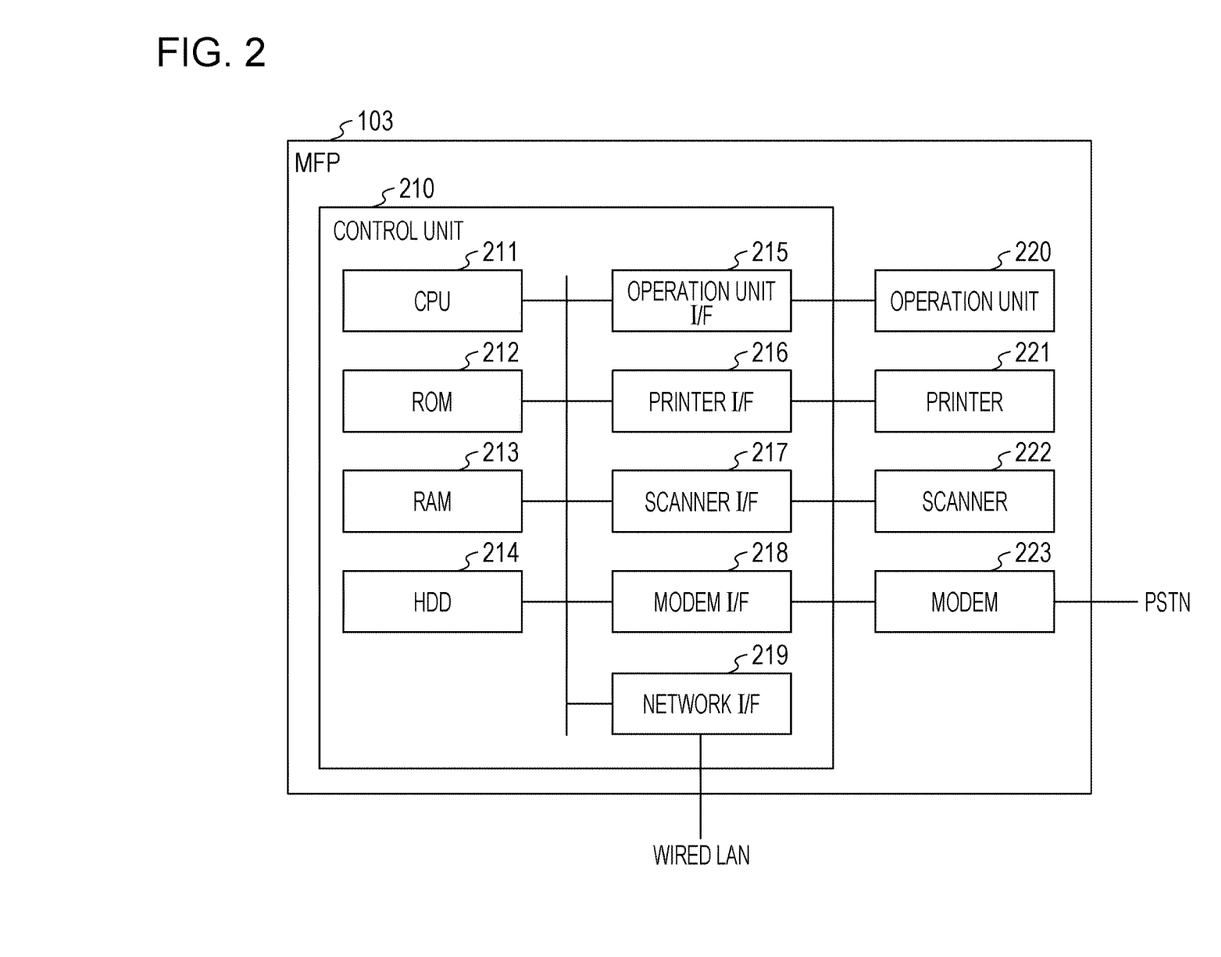
FIG. 2 illustrates a hardware configuration of an MFP according to the exemplary embodiment.

FIG. 2 illustrates a hardware configuration of the MFP 103. The MFP 103 includes a control unit 210, an operation unit 220, a printer 221, a scanner 222, and a modem 223. The control unit 210 includes a CPU 211, a ROM 212, a RAM 213, a HDD 214, an operation unit I/F 215, a printer I/F 216, a scanner I/F 217, a modem I/F 218, and a network I/F 219.

The control unit 210 including the CPU 211 controls an operation of the entire MFP 103. The CPU 211 reads out a control program stored in the ROM 212 and performs various control operations such as reading, printing, and communication. The RAM 213 is used as a temporary storage area such as a main memory or a work area of the CPU 211. It is noted that the MFP 103 is configured to execute respective processing operations illustrated in flow charts which will be described below while the single CPU 211 uses the single memory (the RAM 213 or the HDD 214), but other configurations may be adopted. For example, the respective processing operations illustrated in the flow charts can also be executed while a plurality of CPUs and a plurality of RAMS or the HDD are caused to operate in cooperation with one another.

The HDD 214 stores image data and various programs. The operation unit I/F 215 connects the operation unit 220 to the control unit 210. The operation unit 220 is provided with a liquid crystal display unit having a touch panel function, a keyboard, and the like and plays a role as an acceptance unit configured to accept an operation, an input, and an instruction from a user.

The printer I/F 216 connects the printer 221 to the control unit 210. The image data to be printed by the printer 221 is transferred from the control unit 210 via the printer I/F 216 and printed on a recording medium by the printer 221.

The scanner I/F 217 connects the scanner 222 to the control unit 210. The scanner 222 reads an image on an original document to generate image data and inputs the image data to the control unit 210 via the scanner I/F 217.

The modem I/F 218 connects the modem 223 to the control unit 210. The modem 223 is connected to the PSTN and executes fax communication of the image data with an external facsimile apparatus that is not illustrated in the drawing. The network I/F 219 connects the control unit 210 (the MFP 103) to the wired LAN. The MFP 103 can transmit and receive the image data and the various information with respect to the external apparatus by using the network I/F 219.

Figure 3:
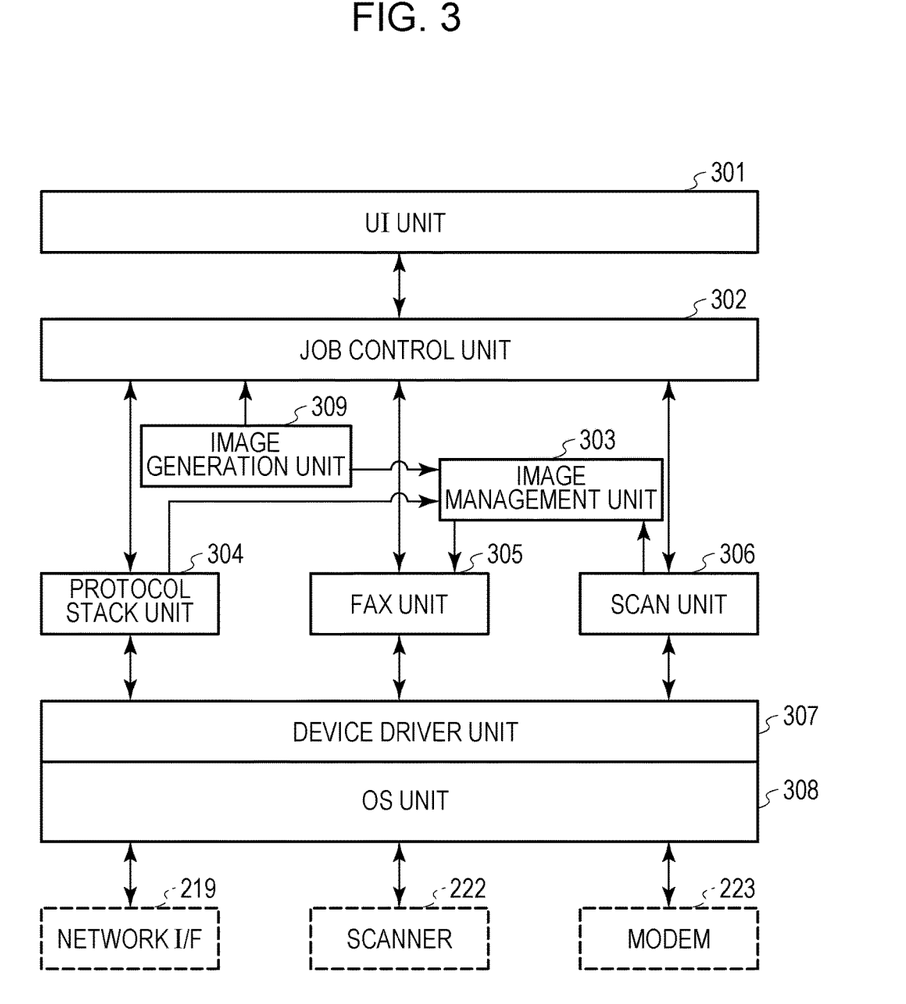
FIG. 3 illustrates a software configuration of the MFP according to the exemplary embodiment.

FIG. 3 is a software configuration diagram of the MFP 103. Each unit indicated by a solid line in FIG. 3 is a software module that is realized while the CPU 211 reads out and executes a program stored in the ROM 212 or the HDD 214. A user interface (UI) unit 301 provides various information to the user via the operation unit 220 and also accepts various instructions from the user. A job control unit 302 is configured to accept jobs such as copying, printing, and fax and control executions of the accepted jobs. A protocol stack unit 304 holds various network protocols such as TCP/IP and Hypertext Transfer Protocol (HTTP).

According to the present exemplary embodiment, the image data transmitted from the tablet-type terminal 101 is received via the network I/F 219 in accordance with the network protocols held in the protocol stack unit 304. The received image data is stored by an image management unit 303. The image management unit 303 is a software module configured to manage the image data stored in the RAM 213 or the HDD 214.

The image management unit 303 stores not only the image data received via the network I/F 219 but also image data generated by the scanner 222. The generation of the image data by the scanner 222 is controlled by a scan unit 306. In addition, the image management unit 303 stores cover sheet image data generated by an image generation unit 309 on the basis of cover sheet information transmitted from the tablet-type terminal 101 as will be described below. A fax unit 305 is configured to control a fax communication via the modem 223. In a case where the fax communication from the MFP 103 is carried out, the fax unit 305 reads out and transmits the image data stored in the image management unit 303 together with a log of the job executed by the job control unit 302.

An operating system (OS) unit 308 is configured to adjust the respective modules and tasks and manage the entire software of the MFP 103. The OS unit 308 is combined with a device driver unit 307. The device driver unit 307 is configured to control hardware devices such as the scanner 222 and the modem 223.

Figure 4:
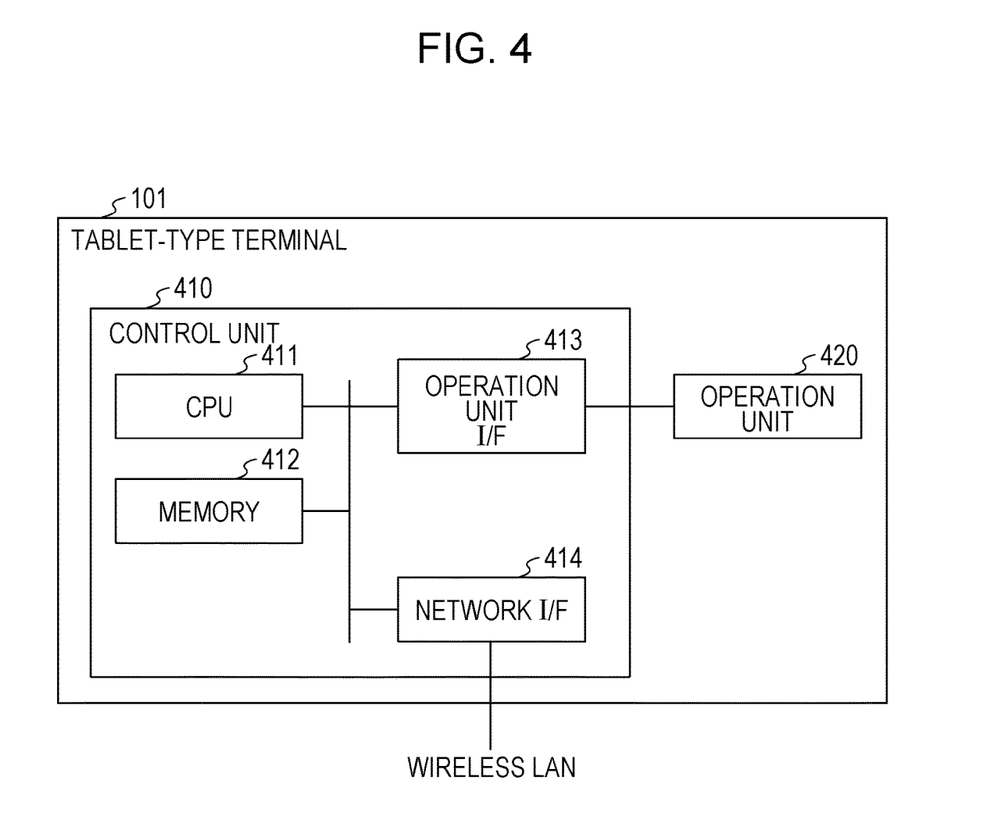
FIG. 4 illustrates a hardware configuration of a tablet-type terminal according to the exemplary embodiment.

FIG. 4 is a hardware configuration diagram of the tablet-type terminal 101. The tablet-type terminal 101 includes a control unit 410 and an operation unit 420. The control unit 410 includes a CPU 411, a memory 412, an operation unit I/F 413, and a network I/F 414. The control unit 410 including the CPU 411 is configured to control the operations of the entire tablet-type terminal 101. The CPU 411 performs various control operations by reading out control programs stored in the memory 412. The memory 412 is also used as a temporary storage area such as a main memory or a work area of the CPU 411. It is noted that the tablet-type terminal 101 is configured to execute the respective processing operations while the single CPU 411 uses the single memory 412, but the other configurations may be adopted. For example, the respective processing operations can also be executed while a plurality of CPUs and a plurality of RAMS are caused to operate in cooperation with one another.

The operation unit I/F 413 connects the operation unit 420 to the control unit 410. The operation unit 420 is provided with a liquid crystal display unit having a touch panel function and plays a role as an acceptance unit configured to accept an operation, an input, and an instruction from the user. The network I/F 414 connects the control unit 410 (the tablet-type terminal 101) to the wireless LAN. The tablet-type terminal 101 can transmit the image data and information to the external apparatus by using the network I/F 414 and receive various information.

Figure 5:
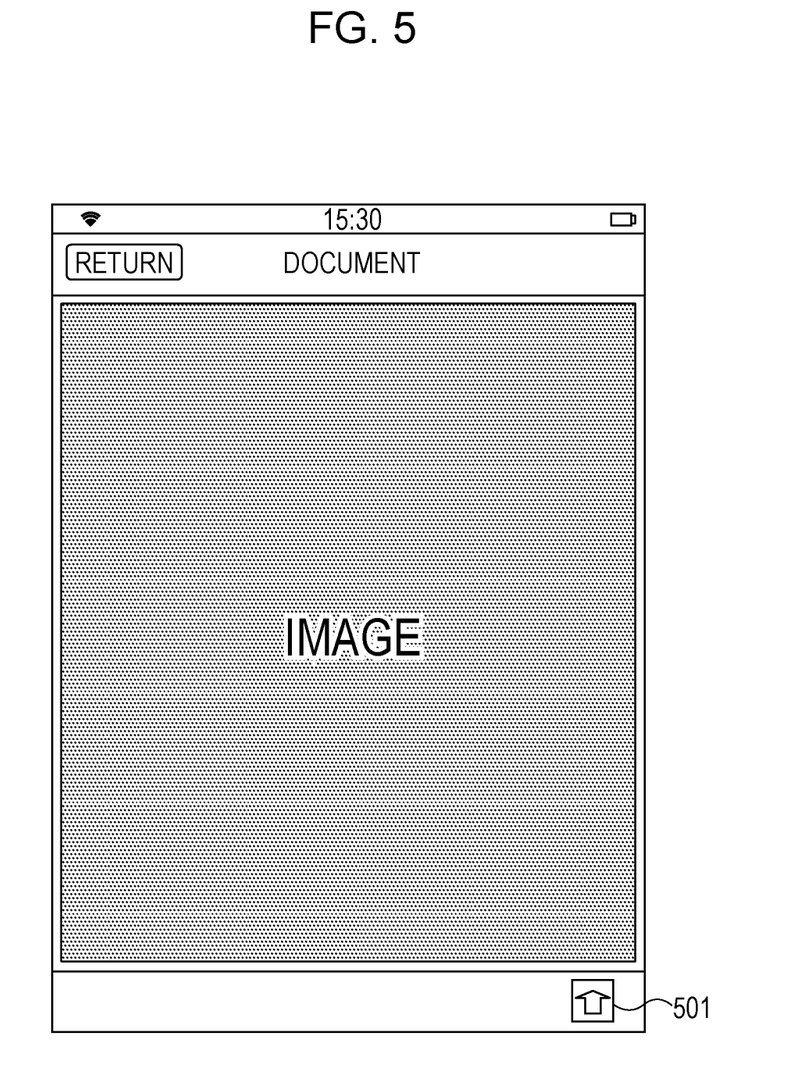
FIG. 5 illustrates an example of an operation screen of the tablet-type terminal according to the exemplary embodiment.

FIG. 5 illustrates an operation screen of an image display application which is displayed on the operation unit 420 of the tablet-type terminal 101. An image and an operation key 501 are displayed on the operation screen of FIG. 5. When the user touches the operation key 501 on the operation screen of FIG. 5, a screen (not illustrated in the drawing) for selecting a function to be executed on the currently displayed image data is displayed. The above-described fax transmission application in addition to an e-mail transmission application, a printing application and the like are displayed as selection candidates on this screen. When the user selects the fax transmission application, the operation screen is switched to an operation screen of FIG. 6. Hereinafter, descriptions will be mainly given of a case where the user selects the fax transmission application. The image displayed in FIG. 5 is an image corresponding to an object of the fax transmission, and this image transmitted by fax will be referred to as a transmission image. In addition, a configuration may be adopted in which a plurality of images are reduced in size and displayed on the screen in FIG. 5, and the image corresponding to the object of the fax transmission is selected while the user selects a checkbox of an arbitrary image from among the plurality of displayed images, for example.

Figure 6:
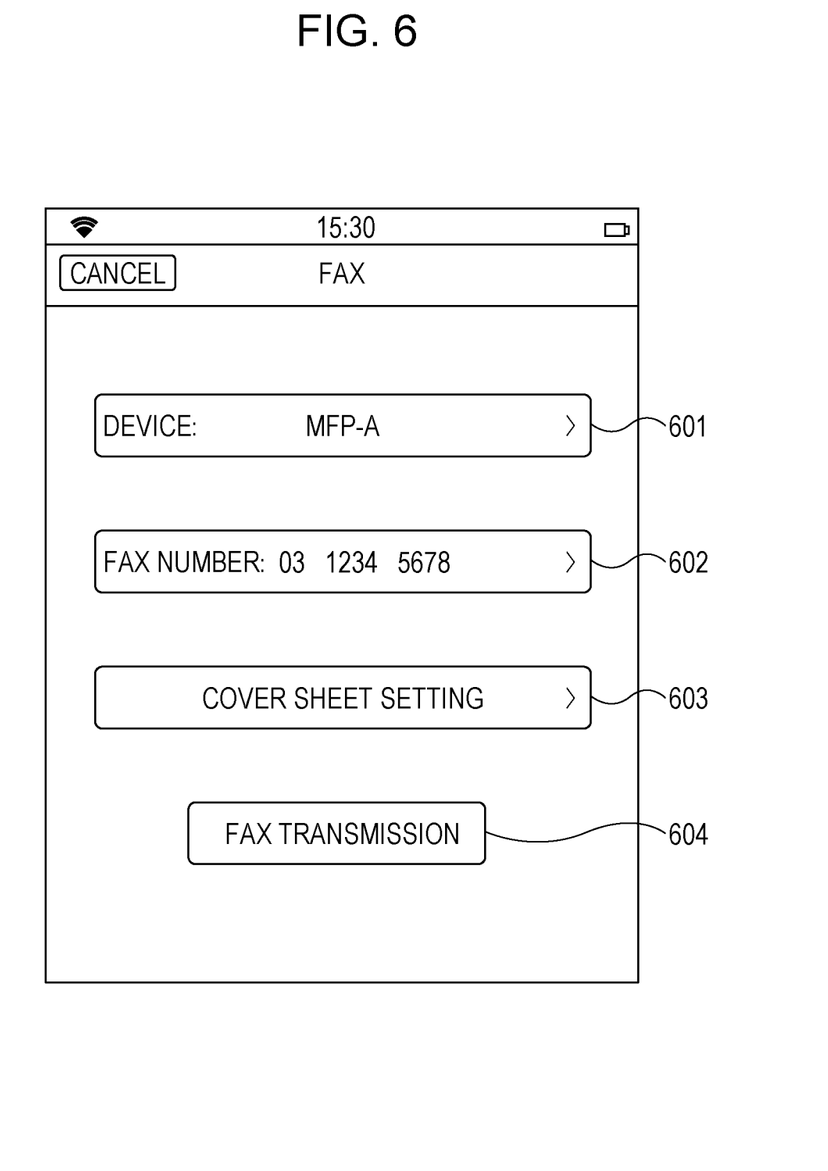
FIG. 6 illustrates an example of a second operation screen of the tablet-type terminal according to the exemplary embodiment.

FIG. 6 illustrates the operation screen of the fax transmission application which is displayed on the tablet-type terminal 101. The fax transmission application is an application that can be downloaded from a server on the Internet and additionally installed on the tablet-type terminal 101 and is software controlled by the CPU 411. Settings for causing the MFP 103 to perform the fax transmission can be made on the tablet-type terminal 101 side by using the fax transmission application. An operation by the tablet-type terminal 101 which will be described below is executed on the basis of an instruction from the fax transmission application.

When the tablet-type terminal 101 activates the fax transmission application, the CPU 411 displays the operation screen illustrated in FIG. 6 on the operation unit 420.

A setting field 601 is a field for setting an MFP that executes the fax transmission. When the setting field 601 is touched, the CPU 411 searches for the MFPs that exist in the vicinity of the CPU 411 and displays the found MFPs in a list. The CPU 411 allows the user to specify the MFP to execute the fax transmission from among the displayed MFPs, and the user touches one of the MFPs displayed in the list to determine the MFP to execute the fax transmission.

A setting field 602 is a field for setting a telephone number (fax number) corresponding to a destination of the fax transmission. When the user touches a part indicated by ">", the CPU 411 displays a soft keyboard on the operation unit 420 of the tablet-type terminal 101, and a telephone number is input on the basis of a key operation by the user. Alternatively, the CPU 411 may display the address book stored in the tablet-type terminal 101, and the user may select a destination from the displayed address book, so that a telephone number of the selected destination can be input. The input telephone number is displayed in the setting field 602. A destination name may be displayed in the setting field 602 instead of the telephone number, or both the destination name and the telephone number may be displayed.

A cover sheet setting field 603 includes a key for performing setting of the cover sheet. When the user touches the displayed key ">", the CPU 411 displays a setting screen for the cover sheet. A detail of the setting screen for the cover sheet will be described by using FIG. 7.

A fax transmission key 604 is a key for instructing the MFP 103 to execute the fax transmission. After the setting of the setting fields 601 to 603 is completed, when it is detected that the fax transmission key 604 is touched, the CPU 411 controls the network I/F to start a communication between the tablet-type terminal 101 and the MFP 103. Specifically, the information set in the setting fields 602 and 603 and the image data corresponding to the object of the fax transmission are transmitted to the MFP set in the setting field 601.

Figure 7:
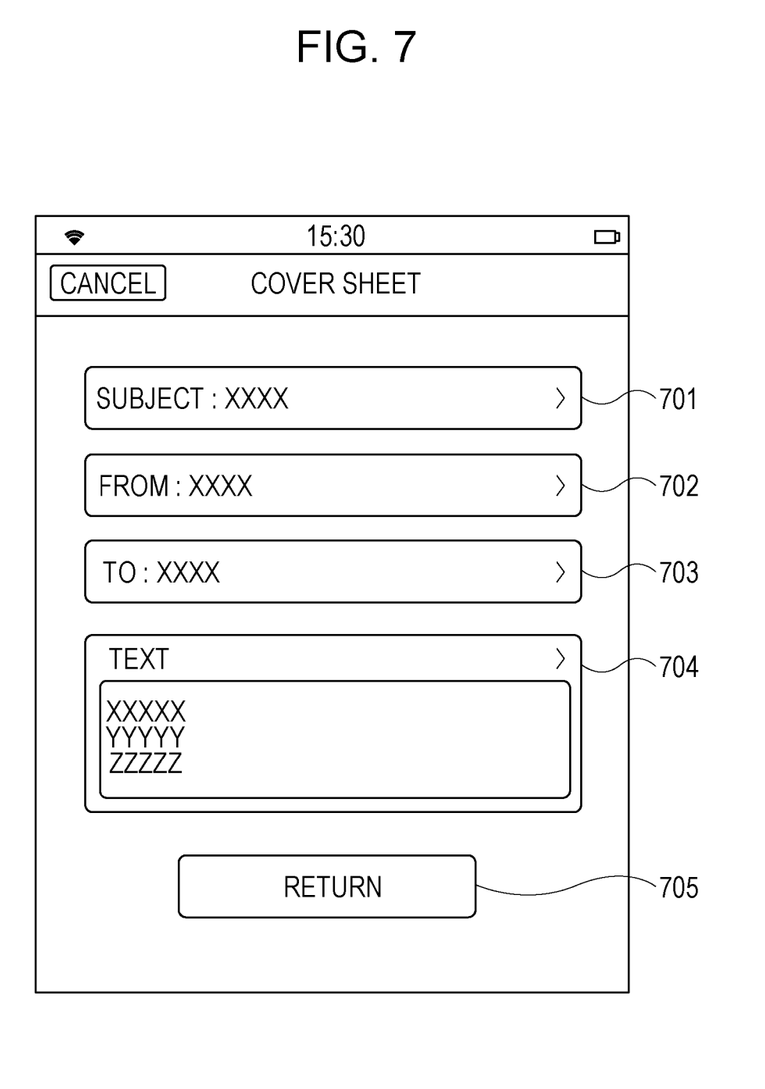
FIG. 7 illustrates an example of a third operation screen of the tablet-type terminal according to the exemplary embodiment.

FIG. 7 illustrates an operation screen of a cover sheet setting in a tablet-type terminal. When the key of the cover sheet setting field 603 in FIG. 6 is touched, the operation screen illustrated in FIG. 7 is displayed.

A setting field 701 is a display field for setting SUBJECT to be output on the cover sheet. When the user touches ">", a text input screen is displayed, and SUBJECT can be input. The CPU 411 displays the input SUBJECT on the operation screen like the setting field 701.

A setting field 702 is a display field for setting FROM to be output on the cover sheet. When the user touches ">", the text input screen is displayed, and FROM can be input. The CPU 411 displays the input FROM on the operation screen like the setting field 702. It is noted that a previously registered content may be displayed, or in a case where a plurality of contents are registered, a configuration may be adopted in which the user selects a content from a pulldown menu.

A setting field 703 is a display field for setting TO to be output on the cover sheet. When the user touches ">", the text input screen is displayed, and TO can be input. The CPU 411 displays the input TO on the operation screen like the setting field 703.

A setting field 704 is a display field for setting a body text (TEXT) to be output on the cover sheet. When the user touches ">", the text input screen is displayed, and the body text can be input. The CPU 411 displays the input body text like the setting field 704.

A key 705 is a key for returning to the operation screen of the fax transmission application in FIG. 6. When the key 705 is touched by the user, the CPU 411 displays the operation screen of the fax transmission application in FIG. 6 to confirm the cover sheet information.

It is noted that the example has been described above in which one destination is used. In a case where a plurality of destinations are used, the individual settings can be made in accordance with the respective destinations.

Figure 8:
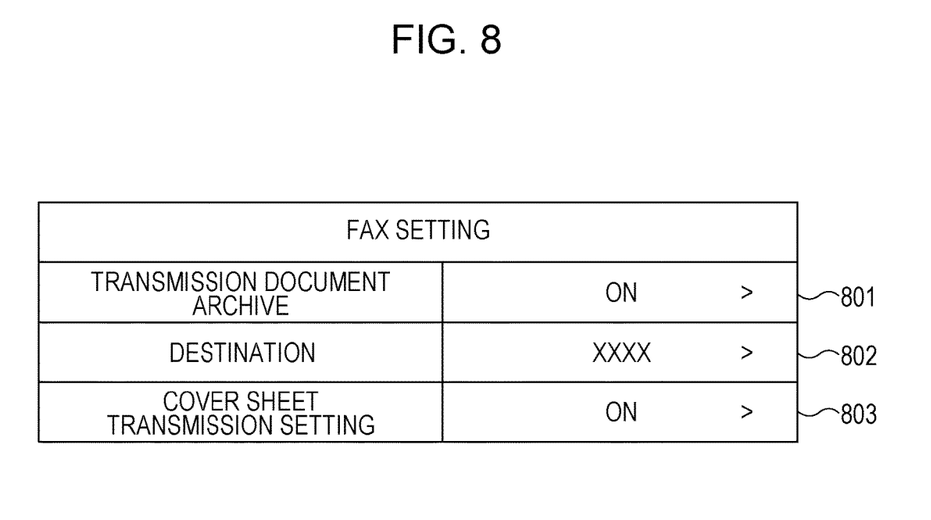
FIG. 8 illustrates an example of an operation screen of a fax setting of the MFP according to the exemplary embodiment.

Next, the setting on the MFP 103 side will be described. FIG. 8 illustrates a setting screen related to a transmission document archive of the fax transmission in the MFP 103. The setting of the transmission document archive is made for each item illustrated here, and in a case where the setting indicated by ">" is selected by the user, the setting of the item can be performed. Respective setting values are saved in the ROM 212, and the saved setting values are referred to when the CPU 211 performs archive transmission processing which will be described below.

A setting field 801 is a display field for setting ON/OFF of the transmission document archive. In a case where ON is set, the archive transmission is performed after the fax transmission, and in a case where OFF is set, the archive transmission is not performed. The archive transmission according to the present exemplary embodiment means that data is transmitted to a destination different from the original destination of the fax transmission.

A setting field 802 is a display field for setting a destination of the archive. When ">" is pressed, an address book is displayed, and an archive destination is selected on the basis of the operation by the user.

A setting field 803 is a display field for setting the presence or absence of the cover sheet in the archive transmission. In a case where ON is set, the image data including the cover sheet is transmitted to the archive destination, and in a case where OFF is set, the image data from which the cover sheet is excluded is transmitted to the archive destination.

The setting screen illustrated in FIG. 8 is displayed on the operation unit 220 of the MFP 103, and the setting is made on the basis of the selection by the user. Alternatively, the setting screen may be displayed on the operation unit 420 of the tablet-type terminal 101 to which application for performing the setting of the MFP 103 is installed, for example, and the setting may be made on the basis of the selection by the user.

Figure 9:
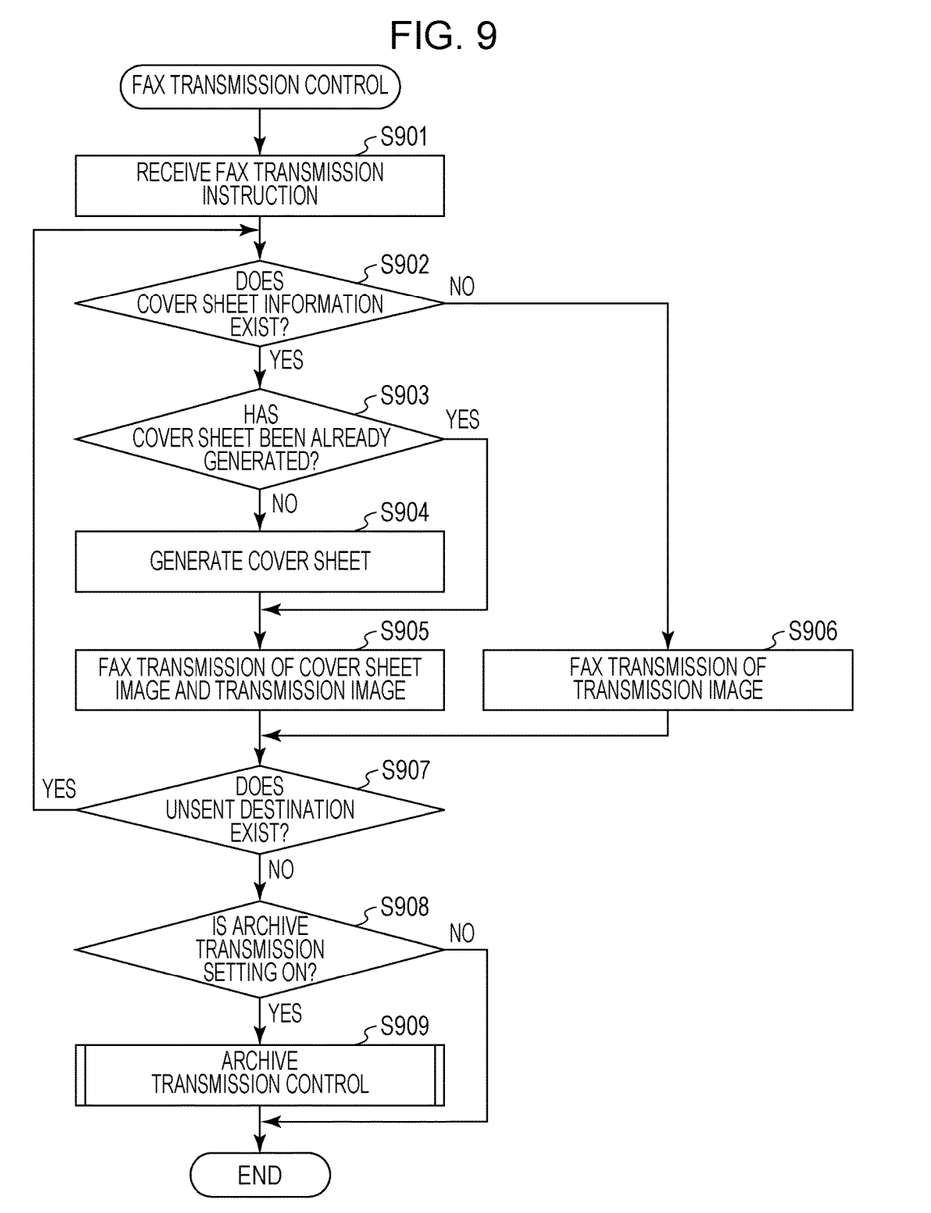
FIG. 9 is a flow chart illustrating an example of fax transmission processing of the MFP according to the exemplary embodiment.

FIG. 9 is a flow chart illustrating an example of fax transmission processing of the MFP 103. The present flow is realized while the CPU 211 executes the control program stored in the ROM 212.

In step S901, the job control unit 302 receives a fax transmission instruction from the tablet-type terminal 101 corresponding to the external terminal via the protocol stack unit 304. The fax transmission instruction includes destination information (fax number), transmission image data, and cover sheet information. The cover sheet information is information input by the user on the operation screen as illustrated in FIG. 7, for example.

In step S902, the job control unit 302 determines the presence or absence of the cover sheet information from the information of the fax transmission instruction. In a case where the cover sheet information is present, the flow shifts to step S903, and in a case where the cover sheet information is absent, the flow shifts to step S906.

In a case where it is determined in step S902 that the cover sheet information is present, the job control unit 302 determines in step S903 whether the cover sheet has been already generated. In a case where the cover sheet has not been generated, the flow shifts to step S904, and in a case where the cover sheet has been already generated, the flow shifts to step S905.

In step S904, the job control unit 302 instructs the image generation unit 309 to generate the cover sheet image. The image generation unit 309 generates cover sheet image data on the basis of the cover sheet information. Subsequently, the image generation unit 309 transmits the generated cover sheet image data to the image management unit 303, and the image management unit 303 saves the cover sheet image data in the RAM 213.

In step S905, the job control unit 302 obtains the fax number of the transmission destination from the fax transmission instruction. Subsequently, the fax transmission instruction is issued to the fax unit 305. The fax unit 305 initiates a call by controlling the modem 223 by the modem I/F 218. When a connection to a facsimile apparatus at the other party is established, the fax transmission is started by controlling the modem 223 by the modem I/F 218. When the fax transmission is started, the fax unit 305 transmits the cover sheet image and the transmission image that are saved in the RAM 213 and managed by the image management unit 303 to the facsimile apparatus at the other party.

On the other hand, in a case where it is determined in step S902 that the cover sheet information is absent, the fax unit 305 transmits only the transmission image to the facsimile apparatus at the other party in step S906.

In a case where a plurality of transmission destinations are specified, the job control unit 302 confirms whether an unsent destination remains in step S907. In a case where the unsent destination remains, the flow shifts to step S902, and in a case where the unsent destination does not remain, the flow shifts to step S908.

In step S908, the job control unit 302 determines whether the archive transmission setting is ON in the setting of the MFP 103. In a case where this setting is ON, the flow shifts to step S909, and in a case where this setting is not ON, the processing is ended.

In step S909, the job control unit 302 performs archive transmission control processing. A detail of this processing will be described on the basis of FIG. 10.

Figure 10:
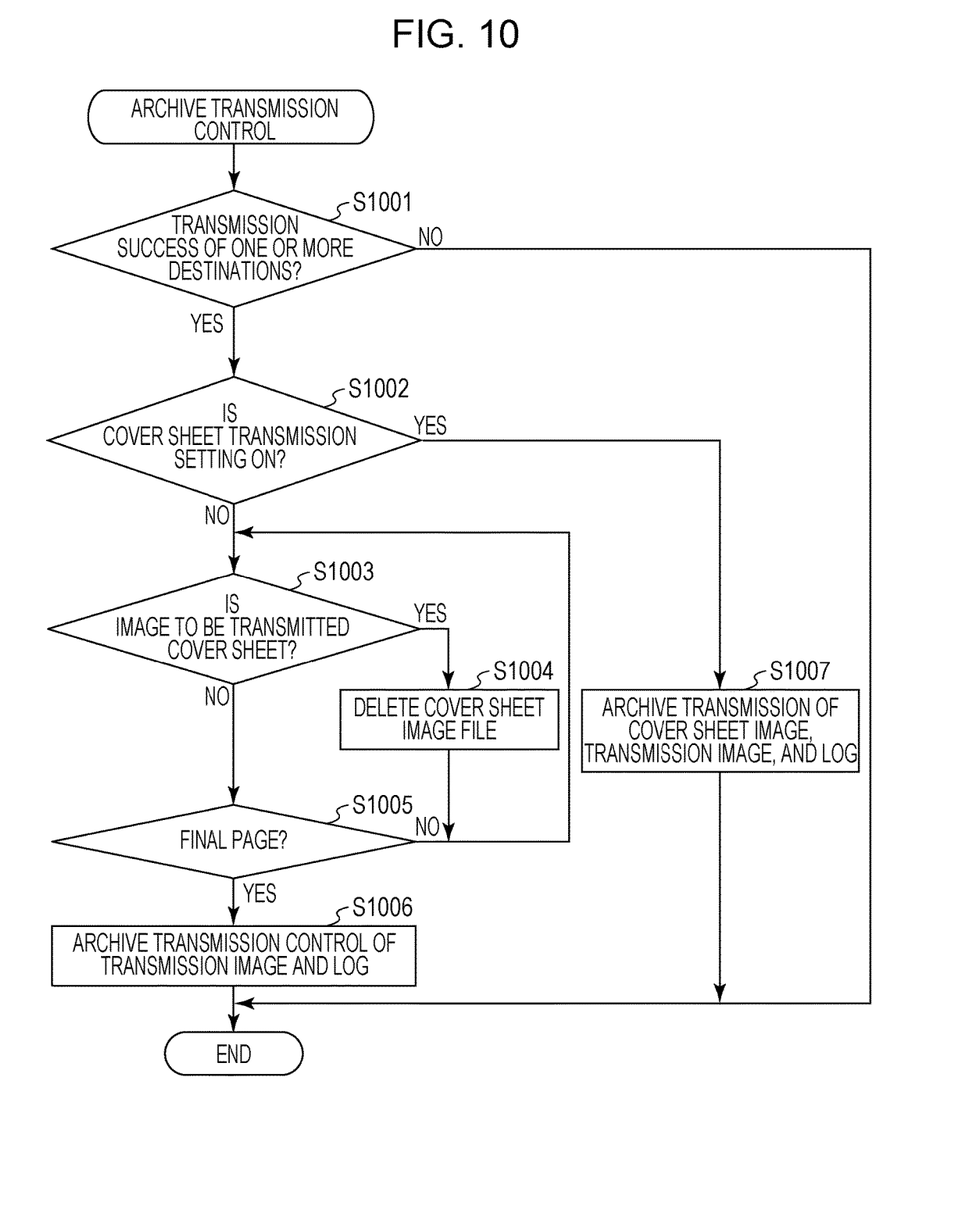
FIG. 10 is a flow chart illustrating an example of archive transmission processing of the MFP according to the exemplary embodiment.

FIG. 10 is a flow chart related to the archive transmission of the MFP 103 which is executed by the job control unit 302. The present flow is realized while the CPU 211 executes the control program stored in the ROM 212.

In step S1001, the job control unit 302 determines whether the fax transmission to one or more destinations is succeeded. In a case where the fax transmission to one or more destinations is succeeded, the flow shifts to step S1002, and in a case where the fax transmission to one or more destinations is not succeeded, the processing is ended.

In step S1002, the job control unit 302 determines whether the cover sheet transmission setting in the archive transmission setting is ON in the setting of the MFP 103. Whether this cover sheet transmission setting is ON is determined on the basis of the content set in the setting field 801 in FIG. 8. According to the present exemplary embodiment, the processing is switched depending on whether the cover sheet transmission setting is ON. Specifically, an object of the archive transmission is switched. Herein, a reason why the processing is switched depending on whether the cover sheet transmission setting is ON will be described. The cover sheet image subjected to the fax transmission is an image that includes the information illustrated in FIG. 7 as described above. However, the information such as the destination, the transmission source, and the transmission time and date is included in the log included at the time of the archive transmission. Therefore, basically, it is not necessary to include the cover sheet image in the archive transmission. On the other hand, since user's needs are diversified, a demand is conceivable for performing the archive transmission while the cover sheet image is also included even when the complication in the image data management and the increase in the transmission data size are taken into account. Therefore, to respect the intention of the user, the processing is switched on the basis of the transmission setting of the cover sheet.

In a case where it is determined in step S1002 that the cover sheet transmission setting is OFF, that is, a case where the setting that the transmission of the cover sheet image is unnecessary is made, the flow shifts to step S1003.

In step S1003, the job control unit 302 determines for each page whether the image corresponding to the object of the archive transmission is a cover page. The image corresponding to the object of the archive transmission refers to an image after the fax transmission. In a case where it is determined in step S1003 that the image corresponding to the processing object is the image of the cover page, the flow shifts to step S1004, and the job control unit 302 deletes the cover sheet image that is generated in step S903 and managed by the image management unit 303. After the deletion, the flow shifts to step S1003.

In a case where it is determined in step S1003 that the image corresponding to the processing object is not the cover page, the flow shifts to step S1005, the job control unit 302 determines whether the image corresponding to the processing object is a final page. In a case where it is determined in step S1005 that the image corresponding to the processing object is not the final page, the flow shifts to step S1003.

In a case where it is determined in step S1005 that the image corresponding to the processing object is the final page, the flow shifts to step S1006. In step S1006, the job control unit 302 transmits the image managed by the image management unit (that is, the transmission image other than the cover sheet image) and the log as the transmission history information to the archive destination (predetermined destination), and the processing is ended. The log is history information indicating details of the job and includes information related to the job such as the destination of the fax transmission, the transmission source, and the transmission time and date. It is noted that the archive destination is the destination set in the setting field 802 in FIG. 8. The user can set, as this archive destination, a destination different from the destination indicated by the destination information included in the fax transmission instruction.

On the other hand, in a case where it is determined in step S1002 that the cover sheet transmission setting is ON, the flow shifts to step S1007. In step S1007, the job control unit 302 transmits the images managed by the image management unit (that is, both the cover sheet image and the transmission image) and the log to the archive destination, and the processing is ended. It is noted that the archive destination is the destination set in the setting field 802 in FIG. 8. The user can set, as this archive destination, a destination different from the destination indicated by the destination information included in the fax transmission instruction.

As described above, when the cover sheet information is transmitted to the MFP 103 according to the present exemplary embodiment from the client, and the MFP 103 adds the cover sheet and performs the fax transmission, it is possible to transit only the transmission image data that does not include the cover page to the archive destination. Therefore, the complication in the image data management and the increase in the transmission data size can be avoided.

Other Exemplified Embodiments

According to the first exemplary embodiment, the descriptions have been given on the basis of the example in which the single cover sheet is created. However, the present invention is not limited to the configuration in which the single cover sheet is created.

For example, in a case where a plurality of destinations are specified with respect to the same transmission image, the cover sheet images for the plurality of destinations are generated in the MFP 103. Herein, in a case where the cover sheet transmission setting in the archive transmission setting is OFF, all the cover sheet image data is deleted, and only the transmission images and the logs are transmitted to the archive destination. In a case where tracking or the like is intended to be performed later by referring to the data of the archive destination, it is possible to confirm which image is transmitted by fax to which destination by referring to the logs including the plurality of destinations and the like and the transmission images.

It is noted that, in a case where a plurality of destinations are specified with respect to the same transmission image, all the cover sheet image data is deleted even when the cover sheet transmission setting is ON, and only the transmission image data is transmitted to the archive destination. This is because importance is given to the deletion of the cover sheet image since the cover sheet image is basically unnecessary as described above. In a case where the plurality of destinations exist, a plurality of cover sheet images are generated in accordance with the respective destinations. Subsequently, a set of the cover sheet image and the transmission image corresponding to the individual destination is transmitted by fax to the individual destination. In the archive transmission, the transmitted image is transmitted to the archive destination. In a case where the plurality of destinations exist, the set of the cover sheet image and the transmission image corresponding to the individual destination is subjected to the archive transmission plural times in accordance with the destinations. That is, the transmission images are redundantly subjected to the archive transmission in some cases, and the problems of the complication of the data management and the increase in the transmission data size become more serious. In view of the above, in a case where the plurality of destinations are specified with respect to the same transmission image, even when the cover sheet transmission setting is ON, the cover sheet image data is deleted, and only the transmission image data is transmitted to the archive destination. At this time, with regard to the transmission image data, only the data corresponding to the single fax transmission is transmitted, so that the complication of the data management and the increase in the transmission data size can be avoided. The information related to the destinations can be confirmed by the log transmitted together with the transmission image data.

Thus, the present invention can also be applied to a case where the plurality of cover sheets are generated as described above.

In addition, the descriptions have been given of the information processing apparatus while the tablet-type terminal is used as an example, but the configuration is not limited to this. For example, information processing apparatus such as a personal computer may also be used. In a case where the personal computer is used, press of a cursor on a screen by using a mouse or the like can be used in place of the "touch" used in the above-described explanations.

Moreover, the descriptions have been given by using an example in which the archive transmission of the transmission image to the storage apparatus such as the file server 104 via the network is performed, but the archive transmission destination is not limited to this. For example, a mode may be adopted in which the transmission image is output to an HDD installed in the image processing apparatus, an HDD connected to the image processing apparatus as an external storage apparatus, or the like.

The purpose of the present invention may also be achieved by executing the following processing. That is, in the processing, a storage medium that records a program code of software that realizes the functions of the above-described exemplary embodiments is supplied to a system or an apparatus, and a computer (or a CPU, an MPU, or the like) of the system or the apparatus reads out the program code stored in the storage medium.

In this case, the program code itself read out from the storage medium realizes the functions of the above-described exemplary embodiments, and the program code and the storage medium that stores the program code constitute the present invention.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-207151, filed Oct. 8, 2014, which is hereby incorporated by reference herein in its entirety.

What is claimed is:

1. A facsimile apparatus comprising:
   at least one processor; and
   at least one memory for storing instructions to be executed by the at least one processor,
   wherein, when the instructions stored in the at least one memory are executed by the at least one processor, the at least one processor causes the facsimile apparatus to function as:
      a reception unit configured to receive from an external apparatus, destination information, cover sheet information, and image data which are used for facsimile transmission;
      a generation unit configured to generate a cover sheet image from the cover sheet information received by the reception unit;
      a transmission unit configured to transmit by fax the cover sheet image generated by the generation unit and the image data received by the reception unit to a destination indicated by the destination information; and
      a sending unit configured to send the image data to an archive destination via a network as transmission history information without sending the cover sheet image to the archive destination via the network as the transmission history information.

2. The facsimile apparatus according to claim 1, wherein, when the instructions stored in the at least one memory are executed by the at least one processor, the at least one processor further causes the facsimile apparatus to function as:
   a setting unit configured to set whether the cover sheet image be sent to the archive destination as the transmission history information,
   wherein, in a case where the setting unit sets that the cover sheet image be sent to the archive destination as the transmission history information, the sending unit sends the cover sheet image and the image data to the archive destination via the network as the transmission history information, and
   in a case where the setting unit sets that the cover sheet image not be sent to the archive destination as the transmission history information, the sending unit sends the image data to the archive destination via the network as the transmission history information without sending the cover sheet image to the archive destination via the network as the transmission history information.

3. The facsimile apparatus according to claim 2,
   wherein, in a case where the reception unit receives cover sheet information corresponding to a plurality of destinations, the generation unit generates a plurality of cover sheet images, and
   wherein, in a case where the generation unit generates the plurality of cover sheet images, even when the setting unit sets that the cover sheet image be sent to the archive destination as the transmission history information, the sending unit sends the image data to the archive destination via the network as the transmission history information without sending the plurality of cover sheet images to the archive destination unit via the network as the transmission history information.

4. The facsimile apparatus according to claim 1, wherein the transmission history information includes at least a destination of the fax transmission, a transmission source, and transmission date and time.

5. The facsimile apparatus according to claim 1, wherein the sending unit sends the image data to an archive destination via the network as transmission history information without sending the cover sheet image to the archive destination via the network as the transmission history information in a case where the fax transmission by the transmission unit is succeeded.

6. A control method for a facsimile apparatus, the control method comprising:
   receiving, from an external apparatus, destination information, cover sheet information, and image data which are used for fax transmission;
   generating a cover sheet image from the received cover sheet information;
   transmitting by fax the generated cover sheet image and the received image data to a destination indicated by the destination information; and
   sending the image data to an archive destination via a network as transmission history information without sending the cover sheet image to the archive destination as the transmission history information.

7. A non-transitory computer-readable storage medium that stores a program for causing a computer to execute a control method for a facsimile apparatus, the control method comprising:
   receiving, from an external apparatus, destination information, cover sheet information, and image data which are used for fax transmission;
   generating a cover sheet image from the received cover sheet information;
   transmitting by fax the generated cover sheet image and the received image data to a destination indicated by the destination information; and
   sending the image data to an archive destination via a network as transmission history information without sending the cover sheet image to the archive destination via the network as the transmission history information.

* * * * *